US012792256B2

(12) United States Patent
Jhan et al.

(10) Patent No.: US 12,792,256 B2
(45) Date of Patent: Nov. 10, 2026

(54) CONTROL CIRCUIT, OPERATION METHOD AND ELECTRONIC DEVICE

(71) Applicant: SILICON MOTION INC., Hsinchu County (TW)

(72) Inventors: Bo-Yan Jhan, Hsinchu County (TW); Wan-Chi Hsieh, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 25 days.

(21) Appl. No.: 18/909,204

(22) Filed: Oct. 8, 2024

(65) Prior Publication Data

US 2025/0217067 A1 Jul. 3, 2025

(30) Foreign Application Priority Data

Jan. 2, 2024 (TW) ................................ 113100154

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G11C 7/1051; G11C 29/08
See application file for complete search history.

(56) References Cited

U.S. PATENT DOCUMENTS

2013/0080858 A1* 3/2013 Lee ..................... G11C 11/5642 714/E11.054
2014/0047269 A1* 2/2014 Kim .................... G11C 11/5642 714/16
2020/0012561 A1 1/2020 Lu
2023/0122474 A1 4/2023 Okamoto et al.
2023/0223097 A1 7/2023 Takada et al.

FOREIGN PATENT DOCUMENTS

TW 201727485 A 8/2017

* cited by examiner

*Primary Examiner* — Albert Decady
*Assistant Examiner* — Kareem Fuad Alhwamdeh
(74) *Attorney, Agent, or Firm* — CKC & Partners Co., LLC

(57) ABSTRACT

A control circuit coupled to a memory through multiple channels. The plurality of channels comprises a first channel, and the control circuit comprises a storage circuit and a processor. The storage circuit is configured to store multiple read-voltage tables and an index register. The processor is coupled to the storage circuit. When an error occurs in a read operation of the first channel, the processor is configured to perform a first retry-read test to the memory through the first channel by sequentially using the multiple read-voltage tables until the first retry-read test is successfully performed by using a target read-voltage table of the multiple read-voltage tables. When the first retry-read test is successfully performed by the processor, the processor determines whether to update the index register according to an analysis of a change history of a stored data in the index register.

19 Claims, 7 Drawing Sheets

TA

| index value | read-voltage table |
|---|---|
| 0 | TB0 |
| 1 | TB1 |
| ..... | ..... |
| k | TBk |

| | read operation | read test operation | | | | | | | | | | |
|---|---|---|---|---|---|---|---|---|---|---|---|---|
| | period P0 | period P1 | period P2 | period P3 | period P4 | period P5 | period P6 | period P7 | period P8 | period P9 | period P10 | ID0=2 |
| first thread (CH0) | ID0=1 failure | TB0 failure | TB1 success | | | | | | | | | |
| second thread (CH1) | | | | TB0 failure | TB1 failure | TB2 success | | | | | | |
| third thread (CH2) | | | | | | | TB0 success | | | | | |
| fourth thread (CH3) | | | | | | | | TB0 failure | TB1 failure | TB2 failure | TB3 success | |

Fig. 8

CONTROL CIRCUIT, OPERATION METHOD AND ELECTRONIC DEVICE

CROSS-REFERENCE TO RELATED APPLICATION

This application claims priority to Taiwan Application Serial Number 113100154, filed Jan. 2, 2024, which is herein incorporated by reference in its entirety.

BACKGROUND

Technical Field

The present disclosure relates to memory technology, especially a control circuit, an operation method and an electronic device.

Description of Related Art

The control circuit of the memory reads the memory by applying a threshold voltage to multiple word lines of the memory. Multiple memory units that are frequently operated together (e.g., multiple pages in the same block) may have similar characteristics. For example, the control circuit can use the same threshold voltage setting (eg, a threshold voltage offset) to read multiple pages located in the same block, and when a reading failure occurs, the control circuit can update the threshold voltage setting to reduce the probability of reading failure. However, if the threshold voltage setting is updated every time a reading failure occurs, the memory control circuit may continuously use threshold voltage settings with a lower read success rate, which instead increases the probability of reading failure.

SUMMARY

One aspect of the present disclosure is a control circuit coupled to a memory through a plurality of channels. The plurality of channels comprises a first channel, and the control circuit comprises a storage circuit and a processor. The storage circuit is configured to store a plurality of read-voltage tables and an index register. The processor is coupled to the storage circuit. When an error occurs in a read operation of the first channel, the processor is configured to perform a first retry-read test to the memory through the first channel by sequentially using the plurality of read-voltage tables until the first retry-read test is successfully performed by using a target read-voltage table of the plurality of read-voltage tables. When the first retry-read test is successfully performed by the processor, the processor determines whether to update the index register according to an analysis of a change history of a stored data in the index register.

Another aspect of the present disclosure is an operation method applied to a control circuit, wherein the control circuit is coupled to a memory through a plurality of channels, the plurality of channels comprises a first channel, a storage circuit of the control circuit stores an index register and a plurality of read-voltage tables, and the operation method comprises: when an error occurs in a read operation of the first channel, performing a first retry-read test to the memory through the first channel by sequentially using the plurality of read-voltage tables until the first retry-read test is successfully performed by using a target read-voltage table of the plurality of read-voltage tables; and when the first retry-read test is successfully performed, determining whether to update the index register according to an analysis of a change history of a stored data in the index register.

Another aspect of the present disclosure is an electronic device, comprising a memory and a control circuit. The control circuit is coupled to the memory, and is configured to store a plurality of read-voltage tables and an index register. The control circuit is configured to perform a first thread, and the first thread is configured for: when an error occurs in a read operation of the first thread, performing a first retry-read test to the memory by sequentially using the plurality of read-voltage tables until the first retry-read test is successfully performed by using a target read-voltage table of the plurality of read-voltage tables; and when the first retry-read test is successfully performed, determining whether to update the index register according to an analysis of a change history of a stored data in the index register.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 8 is a schematic diagram of updating the index register through the operation method.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being “connected to” or “coupled to”, it can be directly connected or coupled to the other element or intervening elements may be present. In contrast, when an element to another element is referred to as being “directly connected” or “directly coupled,” there are no intervening elements present. As used herein, the term "and/or" includes an associated listed items or any and all combinations of more.

Figure 1:
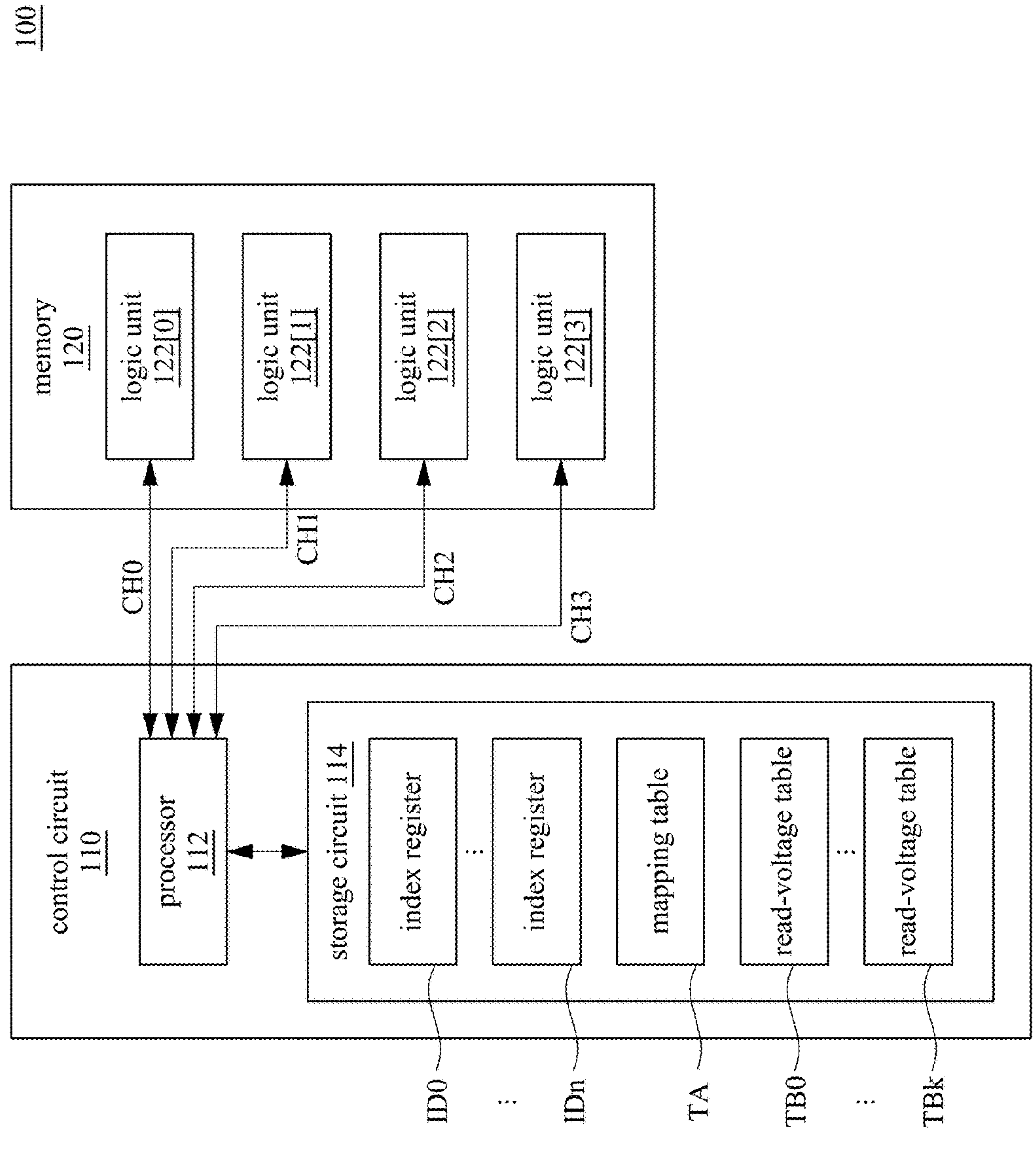
FIG. 1 is a simplified functional block diagram of an electronic device in some embodiments of the present disclosure.

FIG. 1 is a simplified functional block diagram of an electronic device 100 in some embodiments of the present disclosure. The electronic device 100 includes a control circuit 110 and a memory 120. The control circuit 110 is configured to perform a read, write and erase operation to the memory according to a read, write and erase command from an external computing circuit (not shown in figure, such as a central processing unit). In some embodiments, the memory 120 may be implemented by flash memory or other suitable kind of non-volatile memory.

The control circuit 110 includes a processor 112 and a storage circuit 114 coupled to each other. The processor 112 is respectively coupled to multiple logic units (LUN, also known as die) of the memory 120 through multiple channels CH[0]-CH[3]. Each of the logic units 122[0]-122[3] includes multiple blocks, and each of the blocks further includes multiple pages. The storage circuit 114 stores multiple index registers ID0-IDn, a mapping table TA and multiple read-voltage tables TB0-TBk, wherein k is a positive integer greater than 1.

Figures 2, 3:
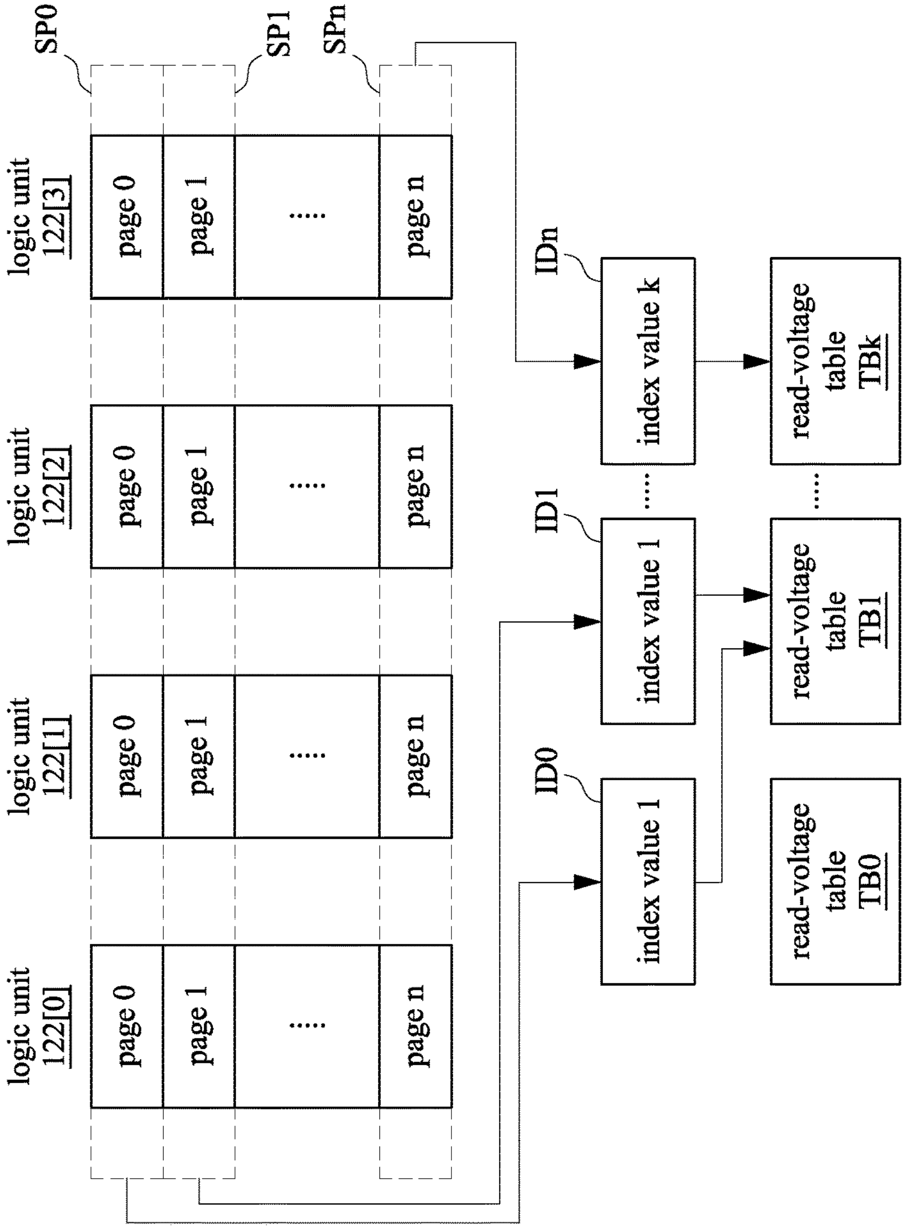
FIG. 2 is a schematic diagram of a mapping table in some embodiments of the present disclosure.
FIG. 3 is a schematic diagram of a relationship between super pages, index registers and read-voltage tables in some embodiments of the present disclosure.

FIG. 2 is a schematic diagram of the mapping table TA in some embodiments of the present disclosure. The mapping table TA includes multiple index values 0-*k*, and records the read-voltage tables TB0-TBk respectively corresponding to the index values 0-*k*. Each of the index registers ID0-IDn is configured to store one of the index values 0-*k*. For example, the index register ID0 and ID1 can store the same index value 1; the index register ID2 can store the index value 3, and the like.

Referring to FIG. 2 and FIG. 3, wherein FIG. 3 is a schematic diagram of a relationship between the super pages SP0-SPn, the index registers ID0-IDn and the read-voltage tables TB0-TBk in some embodiments of the present disclosure. Pages with the same physical location in the logic units 122[0]-122[3] can be combined into a super page, such as super pages SP0-SPn. For example, multiple pages 0 are combined into a super page SP0; multiple pages 1 are combined into a super page SP1; and multiple pages n are combined into a super page SPn, and the like, where n is a positive integer greater than 1. The index registers ID0-IDn respectively correspond to the super pages SP0-SPn. Super page is the smallest unit when the processor 112 reads the memory 120. The processor 112 is configured to read one super page simultaneously through the channels CH[0]-CH[3], and the processor 112 performs a read operation on the super page according to the data stored in the index register corresponding to the super page.

For example, as shown in FIG. 3, when the processor 112 reads the super page SP0, the processor 112 uses a read-voltage table TB1 corresponding to the index value 1 to read the super page SP0 according to the index value 1 stored in the index register ID0 and a mapping relationship of the index value 1 in the mapping table TA. Similarly, since the index register ID1 stores the index value 1, the processor 112 uses the read-voltage table TB1 to read the super page SP1. For another example, since the index register IDn stores the index value k, the processor 112 uses the read-voltage table TBk to read the super page SPn.

The following explains the purpose of the read-voltage tables TB1-TBk. When reading the memory 120, the processor 112 sequentially applies one or more threshold voltages to multiple word lines to determine a bit value stored in a memory cell of the memory 120. For example, if the memory 120 is a Multi-Level Cell (MLC) memory, the processor 112 will sequentially apply three different threshold voltages to the word lines. For another example, if the memory 120 is a Triple-Level Cell (TLC) memory, the processor 112 will sequentially apply 7 different threshold voltages to the word lines. Each of the read-voltage tables TB0-TBk records a deflection of one or more threshold voltages mentioned above, and the processor 112 can adjust the threshold voltages applied to the word lines according to the deflection recorded in the read-voltage tables TB0-TBk, so as to compensate for a threshold voltage variation of the memory 120 under different use conditions (e.g., ambient temperature or total usage hours).

When an error occurs in a read operation of the processor 112 reading a certain super page (e.g., a verification error of Error-correcting code), the processor 112 can update an index register corresponding to the super page, in order to use a read-voltage table with better compensation effect in the subsequent read operation. The following will be explained in detail with reference to FIG. 3-FIG. 7.

Figure 4:
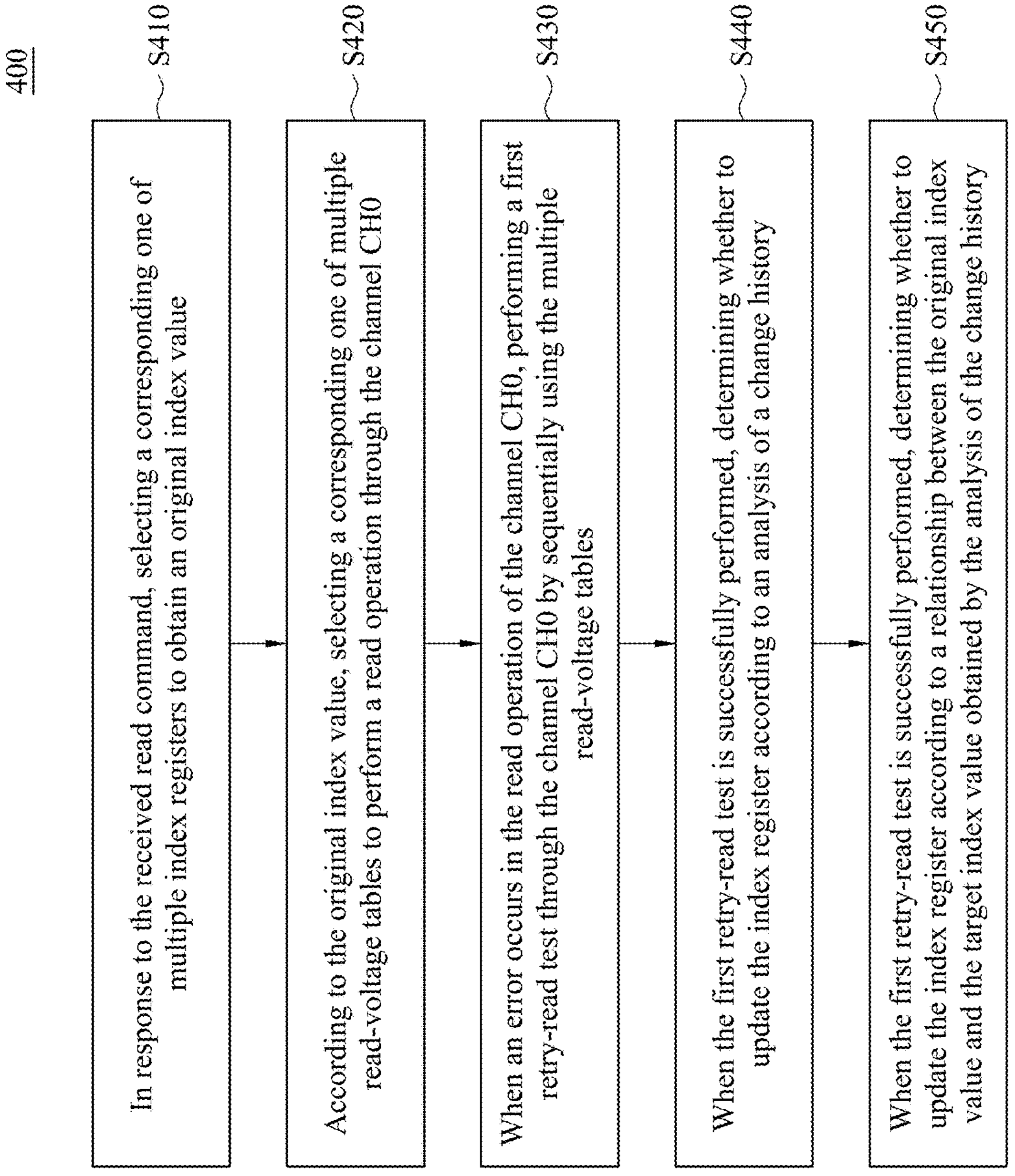
FIG. 4 is a flowchart illustrating a operation method in some embodiments of the present disclosure.

FIG. 4 is a flowchart illustrating an operation method 400 in some embodiments of the present disclosure. The operation method 400 is applied to the control circuit 110 shown in FIG. 1. In the following multiple embodiments, it is assumed that the control circuit 110 reads the super page SP0 and adaptively updates the index register ID0 of the super page SP0, but the present disclosure is not limited to this. The index registers ID1-IDn of other super pages SP1-SPn can also be adaptively updated in a similar method. For the sake of brevity, the details will not be repeated here. It is worth mentioning that since multiple threads of the channels CH0-CH3 will read the super page SP0 at the same time, read errors may occur on these threads one after another within a short period of time. The operation method 400 can prevent these threads from repeatedly updating the index register ID0 in a short period of time.

In step S410, in response to a received read command for the super page SP0, the processor 112 access the index register ID0 corresponding to the super page SP0 in the multiple index registers ID0-IDn of the storage circuit 114. Accordingly, the processor 112 obtains an original index value (e.g., the index value 1) stored in the index register ID0.

In step S420, the processor 112 performs a first thread. According to a mapping relationship of the original index value (e.g., the index value 1) in the mapping table TA, the first thread (the processor 112) selects a corresponding one (the read-voltage table TB1, as shown in FIG. 3) of the multiple read-voltage tables TB0-TBk corresponding to the original index value. Then, by using the read-voltage table TB1, the first thread performs a read operation of the first thread (or the channel CH0) through the channel CH0 to a part of the super page SP0 in the logic unit 122[0]. Specifically, the first thread will determine one or more threshold voltages applied to the multiple word lines of the memory 120 according to the read-voltage table TB1, so as to perform the read operation on the part of the super page SP0 in the logic unit 122[0]. For ease of understanding, the first thread is described as performing the read operation through channel CH0 in the embodiment of FIG. 4, but the present disclosure is not limited to this. In some embodiments, the first thread can perform the read operation through any of the channels CH0-CH3.

In step S430, when an error occurs in a read operation of the first thread (or the channel CH0), such as an verification error of ECC, the first thread performs a first retry-read test through the channel CH0 by sequentially using the multiple read-voltage tables TB0-TBk until the first retry-read test is successfully performed by one of the read-voltage tables TB0-TBk. Specifically, the first thread first uses the read-voltage table TB0 to determine a threshold voltage to apply to the word lines, and read a bit value of the memory cell belonging to the super page SP0 in the logic unit 122[0] to determine whether a verification error of ECC has occurred. If the verification error of ECC occurs, which means the first retry-read test is failure, the first thread then uses the read-voltage table TB1 to determine the threshold voltage applied to the word lines, so as to read a bit value of the memory cell belonging to the super page SP0 in the logic unit 122[0] to determine whether a verification error of ECC has occurred, and the like. On the other hand, if the ECC verification of the first retry-read test is correct after the first thread uses a certain read-voltage table, which means that the first retry-read test is success, the control circuit 110 ends with step S430, and the like. For the sake of clarity, the read-voltage table that will enable the first retry-read test to be successfully performed is called a target read-voltage table below.

When the first retry-read test is successfully performed, the first thread will analyze a change history of the index register ID0, and determines whether to update the index register ID0 according to an analysis (i.e., analysis result) of the change history, wherein the change history can be stored in the storage circuit 114. In some embodiments, the change history of the index register ID0 represents an adjustment process of the stored data in the index register ID0 within a preset period (e.g., the periods P0-P10 shown in FIG. 8) after the error occurs in the read operation of the first thread (or channel CH0). Specifically, in step S440, when the first retry-read test is successfully performed, the first thread determines whether the index register ID0 has been updated (e.g., updated by other threads) according to the analysis of the change history of the index register ID0, so as to determine whether to update the index register ID0. In step S450, when the first retry-read test is successfully performed, the first thread determine whether to update the index register ID0 according to a relationship between the following two obtained by the analysis of the change history: (1) an original index value (e.g., the index value 1) stored by the index register ID0 when the error occurs in the read operation of the channel CH0, and (2) a target index value corresponding to the target read-voltage table enabling the first retry-read test to be successfully performed.

Figure 5:
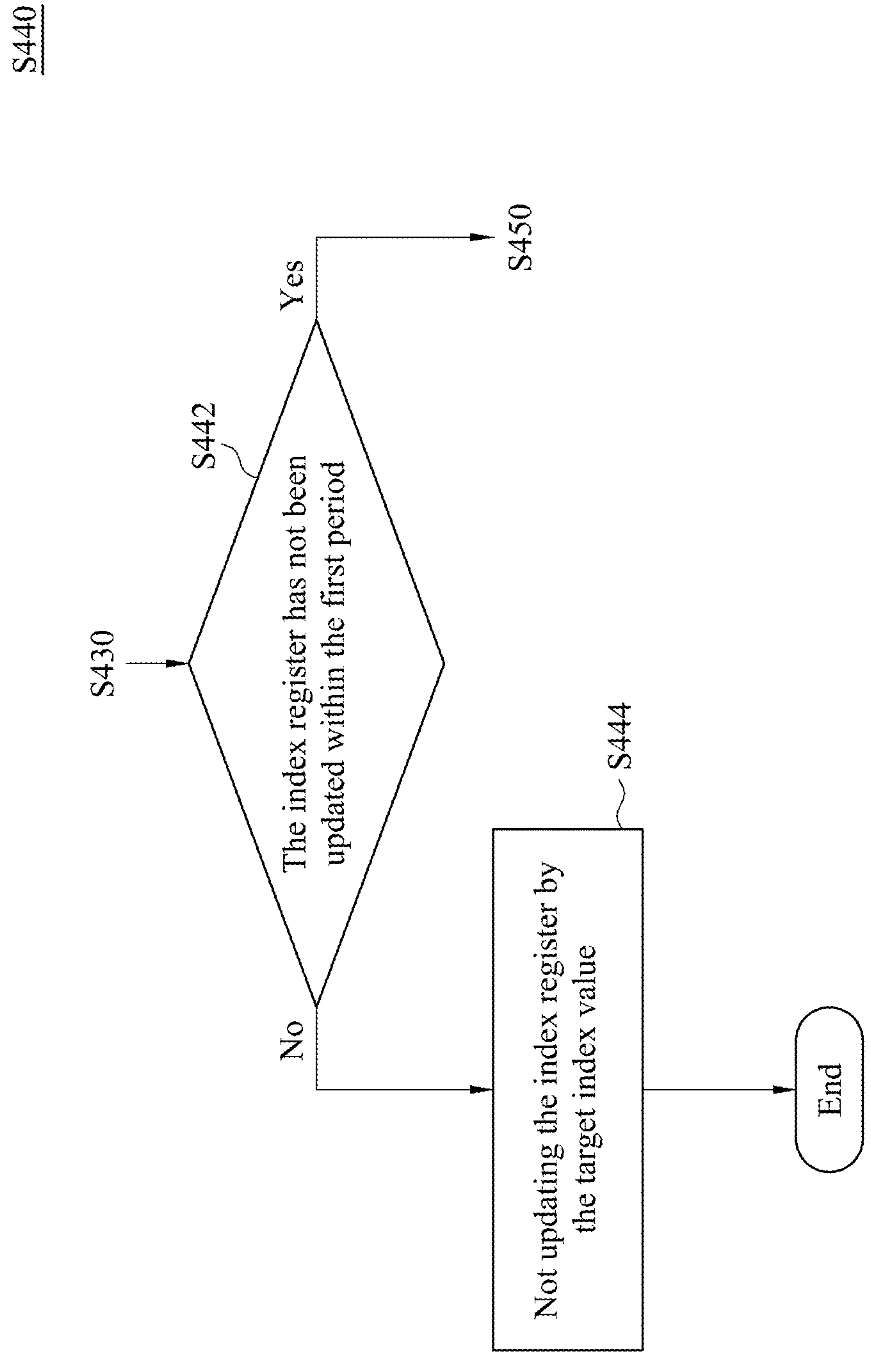
FIG. 5 is a flowchart illustrating a detailed step of the operation method in some embodiments of the present disclosure.

Referring to FIG. 5, FIG. 5 is a flowchart illustrating a detailed step S440 of the operation method in some embodiments of the present disclosure, wherein Step S440 includes steps S442-S444. In step S442, the first thread determines the index register ID0 has not been updated within a first period from when the error occurs in the read operation to when the first retry-read test is successfully performed. If the result of step S442 is "Yes" (i.e., the index register ID0 has not been updated by other threads in the first period), then the control circuit 110 performs step S450 to further determine whether to update the index register ID0 by the target index value. If the index register ID0 has been updated by other threads in the first period, the result of step S442 is "No", and the control circuit 110 performs step S444. In step S444, the first thread does not update the index register ID0 by the target index value, and ends the operation method 400.

In some embodiments, the update of the index register ID0 in the first period can be, for example, a second thread performed by the processor 112 triggered by a second retry-read test performed to the super page SP0 through the channel CH1 in the first period. In summary, step S440 is used to analyze the change history of the index register ID0 to determine whether other threads updated the index register ID0 in the first period, and then determine whether to update the index register ID0. If the index register ID0 has been updated by other threads, the index value currently stored in the index register ID0 may have a higher read success rate (that is, the read-voltage table corresponding to the current index value may have a higher read success rate), and step S440 helps the index register ID0 maintain the index value that may have a higher read success rate.

Figure 6:
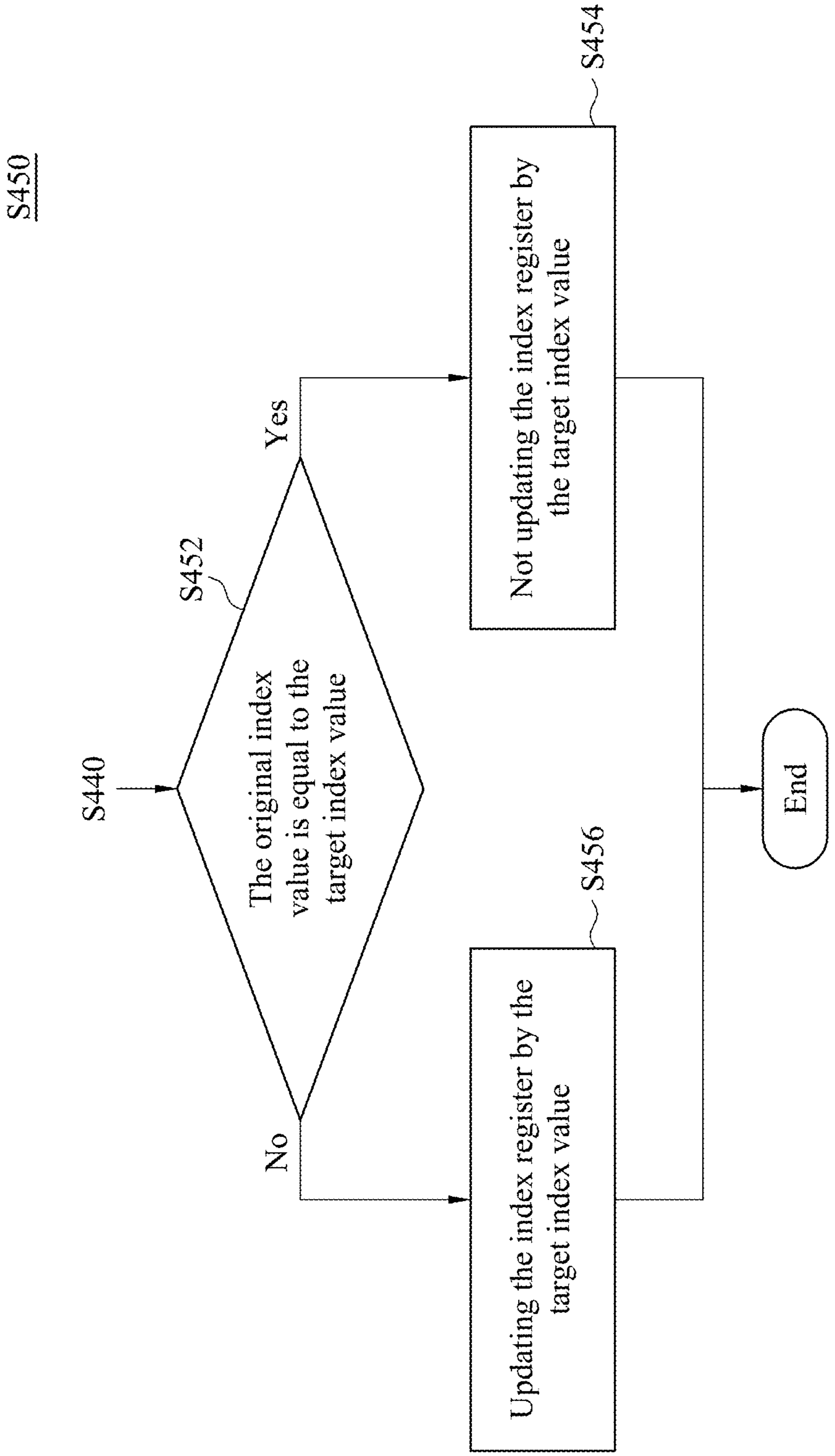
FIG. 6 is a flowchart illustrating a detailed step of the operation method in some embodiments of the present disclosure.

Referring to FIG. 6, FIG. 6 is a flowchart illustrating a detailed step S450 of the operation method in some embodiments of the present disclosure, wherein S450 includes steps S452-S456. In step S452, the first thread determines whether the original index value when an error occurs in a first read operation is equal to the target index value when the first retry-read test is successfully performed. If the result of step S452 is "Yes", the control circuit 110 performs step S454 and does not update the index register ID0 by the target index value. If the result of step S452 is "No", the control circuit 110 performs step S456, so that the first thread updates the index register ID0 by the target index value. That is, the stored data in the index register ID0 is updated to the target index value. In summary, step S450 helps avoid the index register ID0 from repeatedly storing the index value with a lower read success rate.

Figure 7:
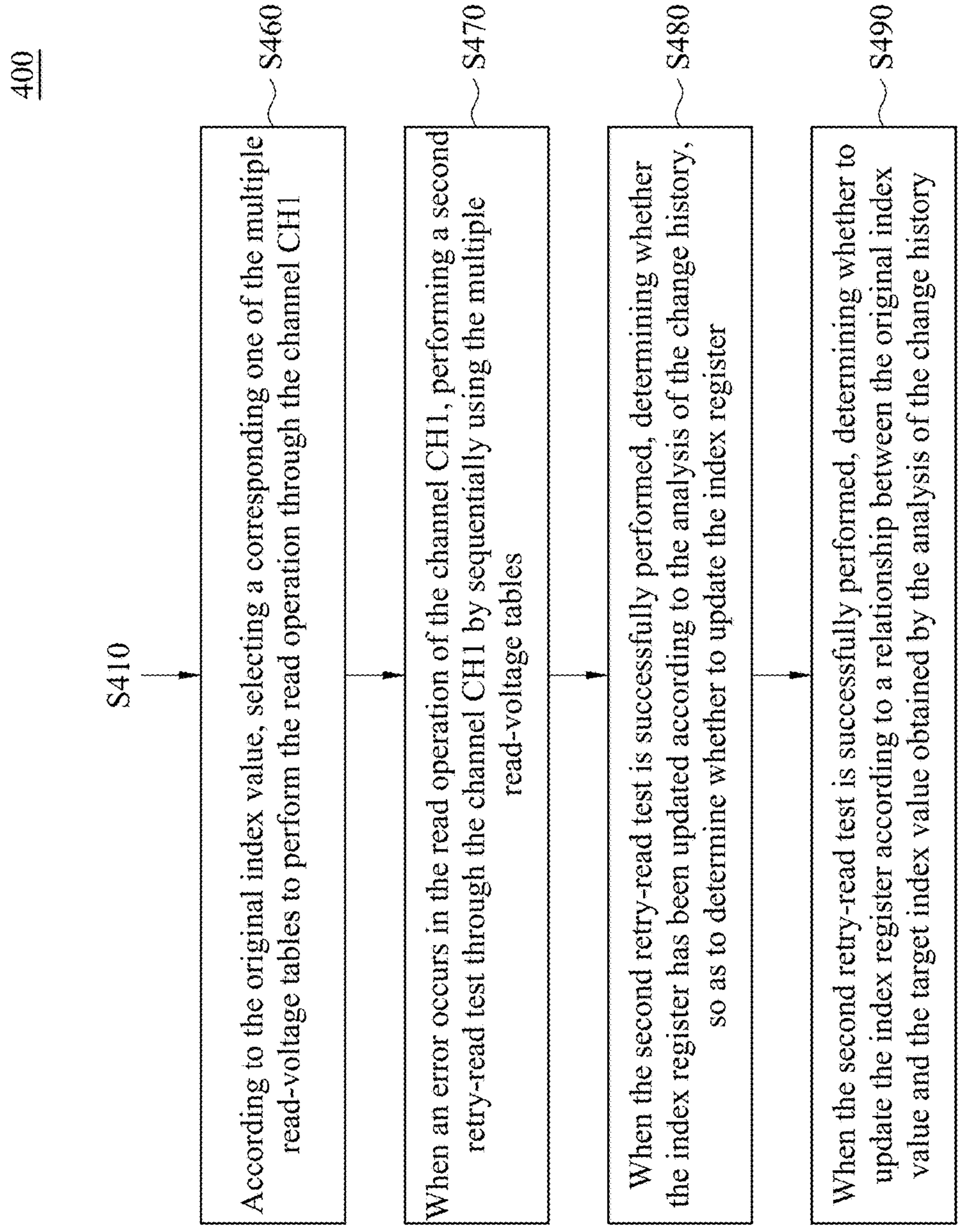
FIG. 7 is a flowchart illustrating multiple additional steps of the operation method in some embodiments of the present disclosure.

Referring to FIG. 7, FIG. 7 is a flowchart illustrating multiple additional steps S460-S490 of the operation method 400 in some embodiments of the present disclosure. As mentioned above, the processor 112 performs multiple threads to read the super page SP0 simultaneously through the channels CH0-CH3, and the multiple threads may occur errors one after another within a short period of time. The above FIG. 3 is used to illustrate the situation where the channel CH0 selectively updates the index register ID0 due to a read error. FIG. 6 illustrates the situation where the channel CH0 and the channel CH1 successively updates the index register ID0 because the channel CH1 also has a read error. The control circuit 110 can perform operations similar to steps S460-S490 on the channels CH2-CH3. For the sake of brevity, it will not be repeated here.

In some embodiments, the operation method 400 further includes steps S460-S490 performed in parallel with steps S420-S450 (i.e., performed after step S410). In step S460, the processor 112 performs a second thread, the second thread selects a corresponding one (e.g., the read-voltage table TB1) of the multiple read-voltage tables TB0-TBk according to an original index value (e.g., the index value 1) stored in the index register ID0, as shown in FIG. 3. Then, the second thread uses the read-voltage table TB1 to decide a threshold voltage applied to the word lines through the channel CH1, so as to perform a read operation to a part of the super page SP0 in the logic unit 122[1].

In step S470, when an error occurs in the read operation of the second thread (or the channel CH1), such as a verification error of ECC, the second thread sequentially uses the read-voltage tables TB0-TBk to perform a second retry-read test to the logic unit 122[1] through the channel CH1, until the second retry-read test is successfully performed. Specifically, the second thread first uses the read-voltage table TB0 to decide a threshold voltage applied to the word lines, so as to read a bit value of the memory cell of the super page SP0 in the logic unit 122[1], and determine whether a verification error of ECC has occurred. If the verification error of ECC has occurred, which means that the second retry-read test is failure, and then the second thread uses the read-voltage table TB1 to decide another threshold voltage applied to the word lines, so as to read a bit value of the memory cell in the logic unit 122[1], and determine whether a verification error of ECC has occurred, and the like. On the other hand, if a target read-voltage table of the read-voltage tables TB0-TBk enabling the ECC verification is correct, which means that the second retry-read test is success, and the control circuit 110 ends step S470, and the like.

When the second retry-read test is successfully performed, the second thread will analyze a change history of the index register ID0, and determine whether to update the index register ID0 according to the analysis of the change history. In some embodiments, the change history represent an adjustment process of the stored data in the index register ID0 within a preset period (e.g., the periods P0-P10 shown in FIG. 8) after the error occurs in the read operation of the second thread (or channel CH1). Specifically, in step S480, the second thread determines whether the index register ID0 has been updated in the read operation of the second thread (or the channel CH1) according to the analysis of the change history, so as to decide/determine whether to update the index register ID0. In step S490, the second thread determine whether to update the index register ID0 according to a relationship between the following two obtained by the analysis of the change history: (1) an original index value (e.g., the index value 1) stored by the index register ID0 when the error occurs in the read operation of the channel CH1, and (2) a target index value corresponding to the target read-voltage table enabling the second retry-read test to be successfully performed. The details of steps S480 and S490 are similar to steps S440 and S450 respectively. For the sake of brevity, it will not be repeated here.

FIG. 8 is a schematic diagram of updating the index register ID0 through the operation method 400. Referring to FIG. 8, the following illustrates a situation that the channels CH0-CH3 all update the index register ID0 due to read errors occurring one after another in a short time when the channels CH0-CH3 reading the super page SP0. In the period P0, in response to a command reading the super page SP0, as shown in FIG. 3 and FIG. 0.8, the processor 112 of the control circuit 110 selects the read-voltage table TB1 and performs a first thread to a fourth thread according to the index value 1 in the index register ID0, so as to read the super page SP0 through the channels CH0-CH3, respectively. The first thread to the fourth thread all have read errors in the period P0.

In the periods P1 and P2, the first thread sequentially uses the read-voltage tables TB0 and TB1 to perform the first retry-read test, and the first retry-read test is successfully performed in the period P2. Since the first thread uses the same read-voltage table TB1 in the periods P1 and P2, according to step S450 shown in FIG. 5, the first thread does not update the index register ID0 by the index value 1 corresponding to the read-voltage table TB1. In the periods P3-P5, the second thread sequentially uses the read-voltage tables TB0-TB2 to perform the second retry-read test, and the second retry-read test is successfully performed in the period P5. Since the index register ID0 has not been updated in the periods P0-P5, and the second thread uses the different read-voltage tables in the periods P0 and P5, according to step S450 shown in FIG. 5 and FIG. 6, the second thread updates the index register ID0 by the index value 2 corresponding to the read-voltage table TB2.

In the period P6, the third thread uses the read-voltage table TB0 to perform a third retry-read test successfully. Since the index register ID0 has been updated by the second thread in the period P5, according to step S440 shown in FIG. 5, the third thread does not updates the index register ID0 by the index value 0 corresponding to the read-voltage table TB0. In the periods P7-P10, the fourth thread sequentially uses the read-voltage tables TB0-TB3 to perform a fourth retry-read test, and the fourth retry-read test is successfully performed in the period P10. Since the index register ID0 has been updated by the second thread in the period P5, according to step S440 shown in FIG. 5, the fourth thread does not updates the index register ID0 by the index value 3 corresponding to the read-voltage table TB3. Therefore, the index register ID0 finally is updated to the index value 2 corresponding to the read-voltage table TB2.

As mentioned above, when reading the same super page repeatedly, the operation method 400 helps improve the chance of the control circuit 110 using a read-voltage table with a higher read success rate, and reduce the probability of read retry to improve reading efficiency.

In the above multiple embodiments, the index registers ID0-IDn correspond to the super pages SP0-SPn respectively, so multiple pages in each super page share the same index value (i.e., share the same read-voltage table), but the present disclosure is not limited to this. The operation method 400 is also applicable to memory cells in the memory 120 being grouped in other ways to share the index value (i.e., share the read-voltage table). In some embodiments, multiple blocks with the same physical location in the logic units 122[0]-122[3] can be combined into multiple super blocks, and the index registers ID0-IDn correspond to multiple super blocks respectively, so that multiple blocks in each super block share the same index value (e.g., share the same read-voltage table). In other embodiments, multiple pages with the same type of storage units in the logic units 122[0]-122[3] can be combined into a super page, and multiple pages in one super page share the same index value (that is, share the same read-voltage table). For example, multiple pages composed of multi-level cells (MLC) can be combined into one super page, and multiple pages composed of three-level cells (TLC) can be combined into another super page.

Any combination of features of the operation method 400 may be implemented as multiple commands stored in a non-transitory computer-readable storage medium. When performed by the processor 112, these commands cause a part or all of the operation method 400 to be performed. It should be understood that the operation method 400 may include more or fewer steps than shown in the flowchart, and steps in the operation method 300 can be performed in any suitable order. For example, step S440 can be omitted, and the control circuit 110 can directly perform step S450 after the end of step S430. For another example, step S450 can be omitted, and the control circuit 110 can directly update the index register ID0 with the target index value when the result of step S442 is "Yes".

Some terms are used in specifications and claims to refer to specific components, but one of ordinary skill in the art should understand that the same component may be called by different terms. Specification and claim do not use the difference in name as a way to distinguish components, but use the difference in function of the components as the basis for differentiation. The term "include" recited in the specification and claim are open-ended terms, so it should be interpreted as "including but not limited to". In addition, "coupled" here includes any direct and indirect means of connection. Therefore, if it is described in the specifications that a first element is coupled to a second element, it means that the first element can be directly connected to the second element through electrical connection or signal connection such as wireless transmission or optical transmission, or it means that the first component can be indirectly electrically or signal-connected to the second component through other components or connection means.

What is claimed is:

1. A control circuit coupled to a memory through a plurality of channels, wherein the plurality of channels comprises a first channel, and the control circuit comprises:

a storage circuit configured to store a plurality of read-voltage tables and an index register, wherein the index register stores an original index value; and a processor coupled to the storage circuit, and configured to perform a read operation of the first channel by using one of the plurality of read-voltage tables corresponding to the original index value, wherein when an error occurs in the read operation of the first channel, the processor is configured to perform a first retry-read test to the memory through the first channel by sequentially using the plurality of read-voltage tables until the first retry-read test is successfully performed by using a target read-voltage table of the plurality of read-voltage tables;

wherein when the first retry-read test is successfully performed by the processor, the processor determines whether to update the index register according to an analysis of a change history of a stored data in the index register.

2. The control circuit of claim 1, wherein the change history represents an adjustment process of the stored data in the index register within a preset period after the error occurs in the read operation of the first channel.

3. The control circuit of claim 1, wherein when the first retry-read test is successfully performed by the processor, the processor determines whether the index register has been updated according to the analysis of the change history, so as to decide whether to update the index register.

4. The control circuit of claim 3, wherein when the processor determines the index register has not been updated according to the analysis of the change history in a first period from when the error occurs in the read operation of the first channel to when the first retry-read test is successfully performed, the processor updates the index register by a target index value corresponding to the target read-voltage table; and wherein when the processor determines the index register has been updated according to the analysis of the change history in the first period, the processor does not update the index register by the target index value.

5. The control circuit of claim 4, wherein the plurality of channels comprises a second channel, and an update of the index register in the first period is associated with a second retry-read test to the memory performed by the processor through the first channel in the first period.

6. The control circuit of claim 1, wherein when the first retry-read test is successfully performed, the processor updates the index register by a relationship between the following two obtained by the analysis of the change history:

(1) the original index value stored by the index register when the error occurs in the read operation of the first channel; and (2) a target index value corresponding to the target read-voltage table.

7. The control circuit of claim 6, wherein when the processor determines the target index value is equal to the original index value according to the analysis of the change history, the processor does not update the index register by the target index value; and when the processor determines the target index value is different from the original index value according to the analysis of the change history, the processor updates the index register by the target index value.

8. An operation method applied to a control circuit, wherein the control circuit is coupled to a memory through a plurality of channels, the plurality of channels comprises a first channel, a storage circuit of the control circuit stores an index register and a plurality of read-voltage tables, the index register stores an original index value, and the operation method comprises:

performing a read operation of the first channel by using one of the plurality of read-voltage tables corresponding to the original index value;

when an error occurs in the read operation of the first channel, performing a first retry-read test to the memory through the first channel by sequentially using the plurality of read-voltage tables until the first retry-read test is successfully performed by using a target read-voltage table of the plurality of read-voltage tables; and when the first retry-read test is successfully performed, determining whether to update the index register according to an analysis of a change history of a stored data in the index register.

9. The operation method of claim 8, wherein the change history represents an adjustment process of the stored data in the index register within a preset period after the error occurs in the read operation of the first channel.

10. The operation method of claim 8, wherein when the first retry-read test is successfully performed, determining whether to update the index register according to the analysis of the change history of the stored data in the index register comprises:

determining whether the index register has been updated according to the analysis of the change history to decide whether to update the index register.

11. The operation method of claim 10, wherein determining whether the index register has been updated according to the analysis of the change history to decide whether to update the index register comprises:

when determining the index register has not been updated according to the analysis of the change history in a first period from when the error occurs in the read operation of the first channel to when the first retry-read test is successfully performed, updating the index register by a target index value corresponding to the target read-voltage table; and when determining the index register has been updated according to the analysis of the change history in the first period, not updating the index register by the target index value.

12. The operation method of claim 11, wherein the plurality of channels comprises a second channel, and an update of the index register in the first period is associated with a second retry-read test to the memory through the second channel in the first period.

13. The operation method of claim 8, wherein determining whether to update the index register according to the analysis of the change history of the stored data in the index register comprises:

updating the index register by a relationship between the following two obtained by the analysis of the change history:

(1) the original index value stored by the index register when the error occurs in the read operation of the first channel; and (2) a target index value corresponding to the target read-voltage table.

14. The operation method of claim 13, wherein updating the index register by the relationship obtained by the analysis of the change history comprises:

when determining the target index value is equal to the original index value according to the analysis of the change history, not updating the index register by the target index value; and when determining the target index value is different from the original index value according to the analysis of the change history, updating the index register by the target index value.

15. An electronic device, comprising:

a memory; and a control circuit coupled to the memory, and configured to store a plurality of read-voltage tables and an index register, wherein the index register stores an original index value, the control circuit is configured to perform a first thread, and the first thread is configured for:

performing a read operation of the first thread by using one of the plurality of read-voltage tables corresponding to the original index value;

when an error occurs in the read operation of the first thread, performing a first retry-read test to the memory by sequentially using the plurality of read-voltage tables until the first retry-read test is successfully performed by using a target read-voltage table of the plurality of read-voltage tables; and when the first retry-read test is successfully performed, determining whether to update the index register according to an analysis of a change history of a stored data in the index register.

16. The electronic device of claim 15, wherein the control circuit is further configured to perform a second thread, and determining whether to update the index register according to the analysis of the change history of the stored data in the index register comprises:

determining whether the index register has been updated by the second thread according to the analysis of the change history to decide whether to update the index register.

17. The electronic device of claim 16, wherein determining whether the index register has been updated by the second thread according to the analysis of the change history to decide whether to update the index register comprises:

when determining the index register has not been updated by the second thread according to the analysis of the change history in a first period from when the error occurs in the read operation of the first thread to when the first retry-read test is successfully performed, updating the index register by a target index value corresponding to the target read-voltage table; and when determining the index register has been updated according to the analysis of the change history in the first period, not updating the index register by the target index value.

18. The electronic device of claim 15, wherein determining whether to update the index register according to the analysis of the change history of the stored data in the index register comprises:

updating the index register by a relationship between the following two obtained by the analysis of the change history:

(1) the original index value stored by the index register when the error occurs in the read operation of a first channel; and (2) a target index value corresponding to the target read-voltage table.

19. The electronic device of claim 18, wherein updating the index register by the relationship obtained by the analysis of the change history comprises:

when determining the target index value is equal to the original index value according to the analysis of the change history, not updating the index register by the target index value; and when determining the target index value is different from the original index value according to the analysis of the change history, updating the index register by the target index value.

* * * * *